(12) United States Patent
Omori (10) Patent No.: US 7,636,925 B2
(45) Date of Patent: Dec. 22, 2009

(54) DISK DRIVE DEVICE AND BASE UNIT

(75) Inventor: Kiyoshi Omori, Tokyo (JP)

(73) Assignee: Sony Corporation, Tokyo (JP)

( * ) Notice: Subject to any disclaimer, the term of this patent is extended or adjusted under 35 U.S.C. 154(b) by 118 days.

(21) Appl. No.: 10/557,202

(22) PCT Filed: Mar. 15, 2005

(86) PCT No.: PCT/JP2005/004519

§ 371 (c)(1),
(2), (4) Date: Nov. 17, 2005

(87) PCT Pub. No.: WO2005/098861

PCT Pub. Date: Oct. 20, 2005

(65) Prior Publication Data

US 2007/0067789 A1    Mar. 22, 2007

(30) Foreign Application Priority Data

Mar. 31, 2004    (JP)    ............................. 2004-104175

(51) Int. Cl.
*G11B 7/00* (2006.01)
(52) U.S. Cl. ...................................... 720/652
(58) Field of Classification Search ................. 720/685, 720/652
See application file for complete search history.

(56) References Cited

U.S. PATENT DOCUMENTS 6,469,970 B2 * 10/2002 Nishi .......................... 720/685
7,093,268 B2 * 8/2006 Kamei et al. ................. 720/601
7,370,338 B2 * 5/2008 Mitsumoto et al. .......... 720/601
2003/0193787 A1 * 10/2003 Manabe et al. .............. 361/752

FOREIGN PATENT DOCUMENTS

| JP | 5-258548 | 10/1993 |
| JP | 10-188327 | 7/1998 |
| JP | 11-25666 | 1/1999 |
| JP | 2001-35144 | 2/2001 |

* cited by examiner

*Primary Examiner*—Mark Blouin
(74) *Attorney, Agent, or Firm*—Oblon, Spivak, McClelland, Maier & Neustadt, L.L.P.

(57) ABSTRACT

The present invention relates to a disk drive apparatus or a base unit which can prevent contact between an FPC (flexible Printed Circuit board) and an optical disk. The FPC 116 is connected at one end portion thereof to an optical pickup 115 and is extended in one of feeding directions thereof (for example, in a substantially leftward direction), curved and turned back intermediately and then extended in the other one of the feeding directions (for example, in a substantially rightward direction). The top cover 117 is attached between the FPC 116 and the optical disk and covers part of the FPC 116. A guide part 118 is attached to a portion which corresponds to a framework of a dotted line on the lower face of the top cover 117 for guiding the posture of the FPC 116 so that a portion of the FPC 116 which is not covered with the FPC 116 and the optical disk are spaced away from each other. The present invention can be applied to a drive apparatus for an optical disk such as a DVD or a CD.

8 Claims, 8 Drawing Sheets

DISK DRIVE DEVICE AND BASE UNIT

TECHNICAL FIELD

This invention relates to a disk drive apparatus and a base unit, and more particularly to a disk drive apparatus and a base unit which can prevent contact between a flexible printed circuit board and an optical disk.

BACKGROUND ART

Conventionally, optical disks such as a CD (Compact Disk) and a DVD (Digital Versatile Disk) are widely known, and various disk drive apparatus compatible with such optical disks have been proposed (refer to, for example, Patent Document 1 or Patent Document 2).

Figure 1:
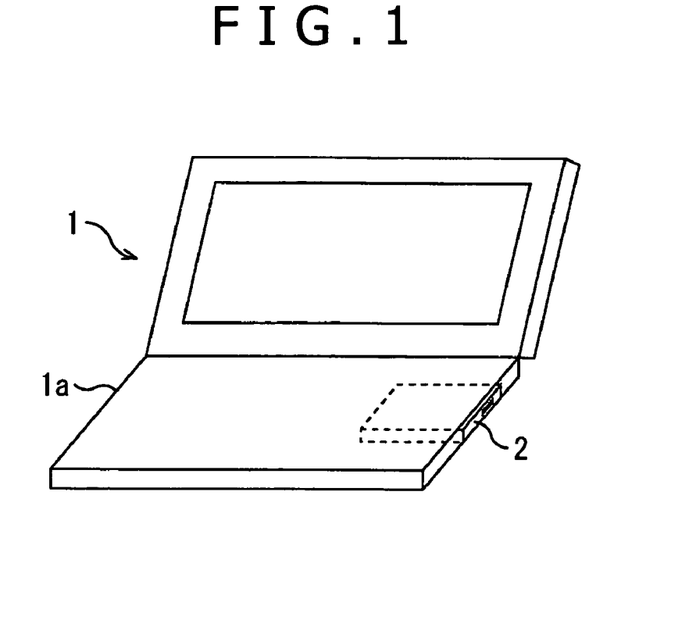
FIG. 1 is a view showing an example of a configuration of an appearance of a personal computer in which a conventional disk drive apparatus is incorporated.

For example, as shown in FIG. 1, such a conventional disk drive apparatus 2 as described above is incorporated in a apparatus body 1a of a notebook type personal computer 1, and records an information signal supplied thereto from the apparatus body 1a on an optical disk (for example, an optical disk 3 of FIG. 3 hereinafter described or reads out (reproduces) an information signal recorded on an optical disk and supplies the information signal to the apparatus body 1a.

Figure 2:
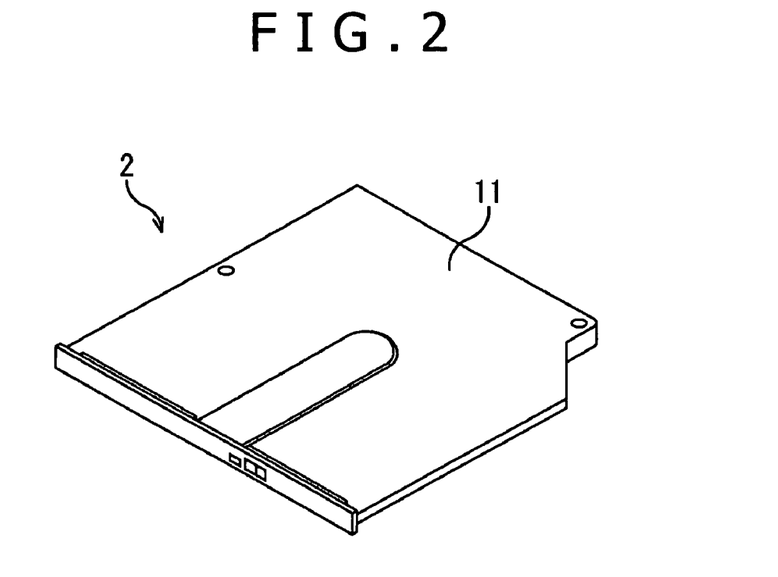
FIG. 2 is a view showing an example of an appearance of the conventional disk drive apparatus.

The conventional disk drive apparatus 2 includes such a housing 11 as shown in FIG. 2. The disk drive apparatus 2 further includes such a disk tray 12 and a disk drive unit attached to the disk tray 12 as shown in FIG. 3, both accommodated in the housing 11. The disk drive unit includes a turntable 15, an optical pickup 16, a flexible printed circuit board (hereinafter referred to as FPC) 17, and so forth.

Further, the conventional disk drive apparatus 2 includes a front panel 13 in the form of a substantially rectangular flat plate attached to the front face (left side face in FIG. 3) of the disk tray 12 for opening and closing a tray gateway of the housing 11. An eject button 14 is provided on the front face of the front panel 13 such that it is depressed in order to eject the disk tray 12 from the housing 11.

Further, the conventional disk drive apparatus 2 includes a decorative laminate 18 (hereinafter referred to as top cover 18) between the lower face of the disk tray 12 and the FPC 17. Another decorative laminate 19 (hereinafter referred to as bottom cover 19) is provided below the lower face of the FPC 17.

The turntable 15 drives an optical disk 3 mounted thereon to rotate.

The optical pickup 16 moves in radial directions of the optical disk 3 which is driven to rotate by the turntable 15 (action of such movement is hereinafter referred to as feeding movement. Further, the direction of the feeding movement is referred to as feeding direction) to perform writing or reading out operation of a signal to and from the optical disk 3. Accordingly, the top cover 18 has such an opening 18a opened by a predetermined distance in a direction (hereinafter referred to as widthwise direction) substantially perpendicular to the feeding direction of the optical pickup 16 as shown in FIG. 3 so that light may not be interrupted between the optical pickup 16 and the lower face of the optical disk 3.

Various signals to be transferred between the optical pickup 16 and the personal computer 1 and so forth such as, for example, signal lines for transmitting an instruction signal for performing writing or reading out operation of a signal on or from the optical disk 3 described above or a signal which makes an object of writing or reading out, are laid on the FPC 17.

Therefore, the FPC 17 is connected at one end portion thereof to the optical pickup 16 and connected at the other end portion thereof to a connector not shown disposed below the optical pickup 16 and below and in the proximity of the turntable 15. In particular, the FPC 17 is disposed such that it is connected at one end portion thereof to the optical pickup 16, extended in one of the feeding directions (substantially leftwardly in FIG. 3) of the optical pickup 16, curved and turned back intermediately and extended in the opposite direction of the feeding directions (substantially rightwardly in FIG. 3). Accordingly, the FPC 17 has such a curved portion 17a as hereinafter described with reference to FIG. 6 and is drawn around between the optical pickup 16 and the connector. In other words, also the position (position in the feeding direction) of the curved portion 17a of the FPC 17 moves in response to the feeding movement of the optical pickup 16.

Figure 3:
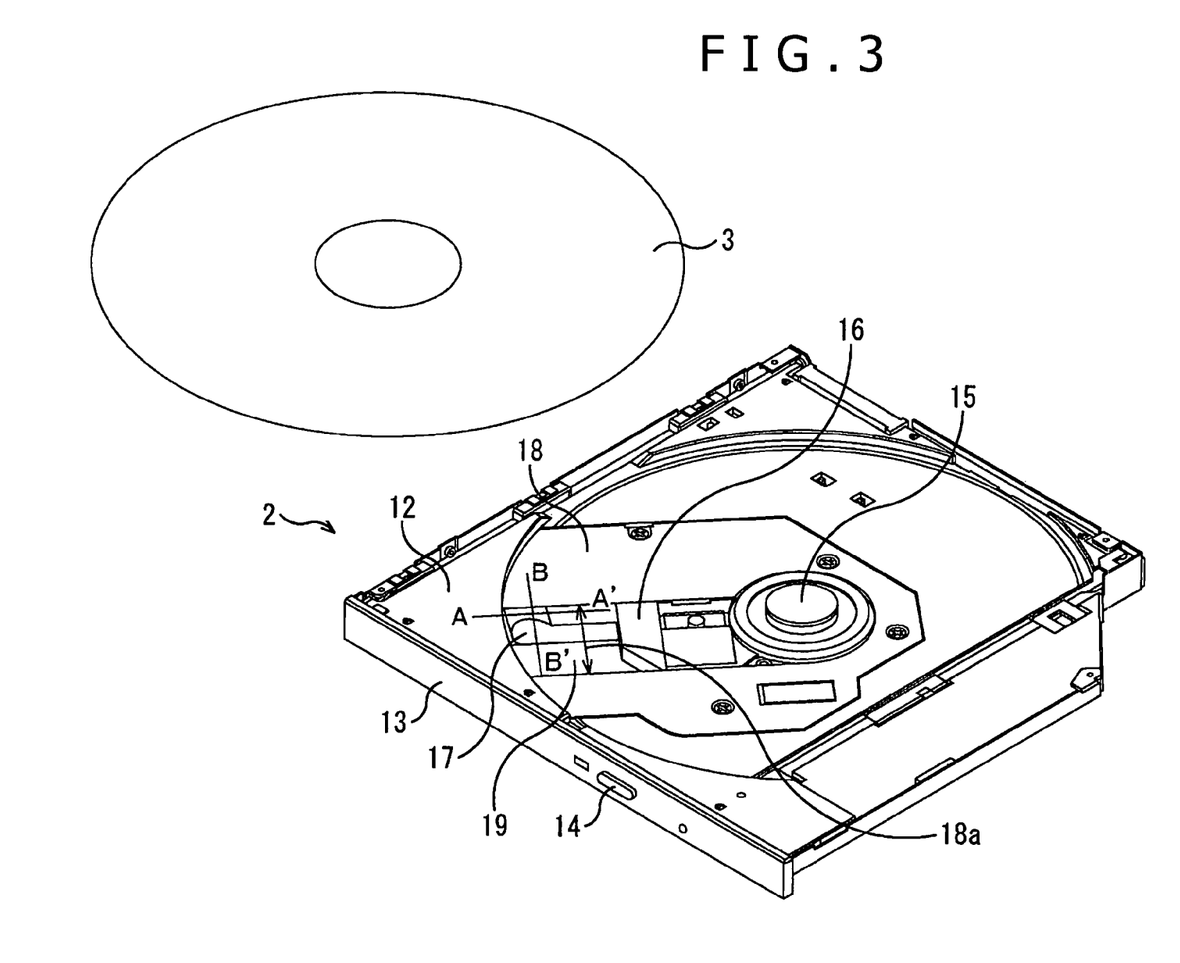
FIG. 3 is a view showing an example of a configuration of an appearance of the conventional disk drive apparatus from which a housing of FIG. 2 is removed.
Figure 4:
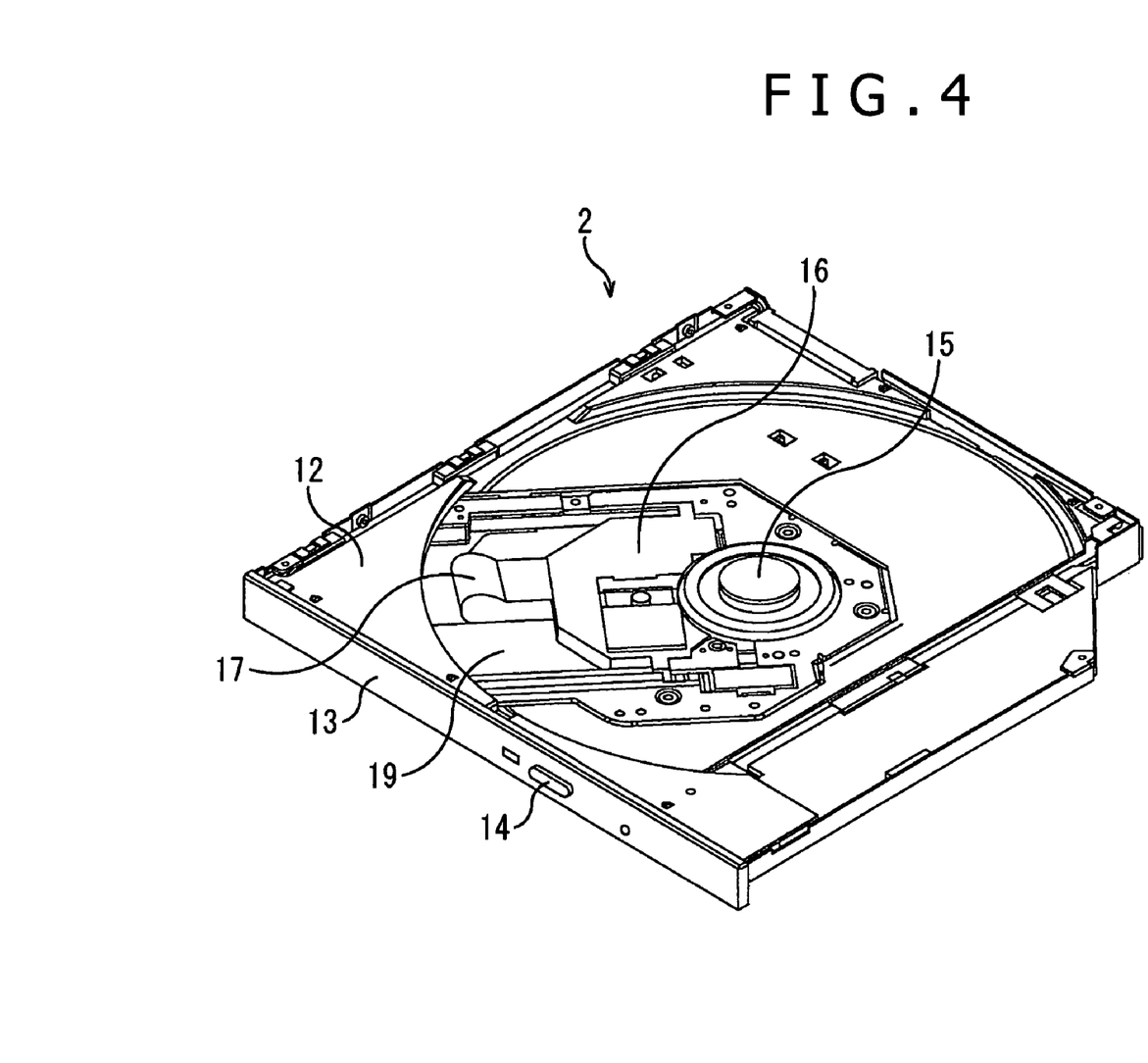
FIG. 4 is a view showing an example of a configuration of an appearance of the conventional disk drive apparatus from which a top cover of FIG. 3 is removed.

FIG. 4 shows a perspective view of the disk drive apparatus 2 from which the housing 11 of FIG. 2 is removed and the top cover 18 of FIG. 3 is removed.

[Patent Document 1]
Japanese Patent Laid-Open No. 2001-229659
[Patent Document 2]
Japanese patent Laid-Open No. 2001-325740

DISCLOSURE OF THE INVENTION

Problem to be Solved by the Invention

Incidentally, recently an optical pickup which is compatible with recording formats of optical disks 3 such as a CD and a DVD is frequently used as the optical pickup 16 shown in FIG. 3. Where such an optical pickup 16 of the type as just described is adopted, the number of signals for controlling driving of the optical pickup 16 so as to be ready for the different recording formats, that is, the number of wiring lines on the FPC 17, increases. As a result, the width of the FPC 17 increases, and the FPC 17 fails to be entirely covered with the top cover 18 as seen in FIG. 3. In other words, part of the FPC 17 protrudes in a widthwise direction from the top cover 18.

In such an instance as just described, such a situation that the protruding portion of the FPC 17 in the widthwise direction from the top cover 18 protrudes also in an upward direction farther than the top cover 18 until it slidably contacts with the optical disk 3 increases. As a result, such a problem occurs that the signal lines laid on the FPC 17 are damaged or a bad influence is had on signals flowing along the signal lines.

This problem is further described below with reference to FIGS. 5 to 7.

Figure 5:
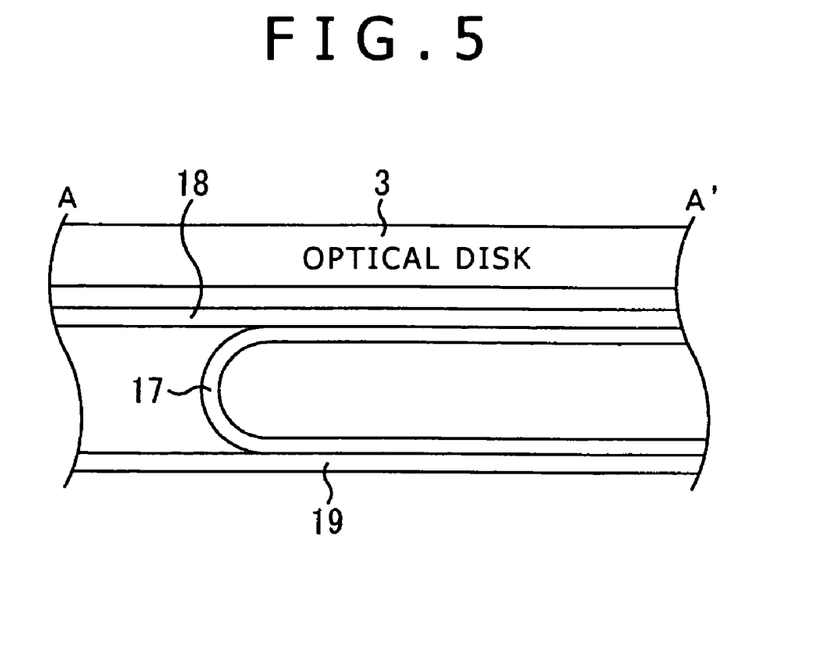
FIG. 5 is an example of a sectional view of the conventional disk drive apparatus illustrating a state wherein and FPC is covered entirely with the top cover.
Figure 6:
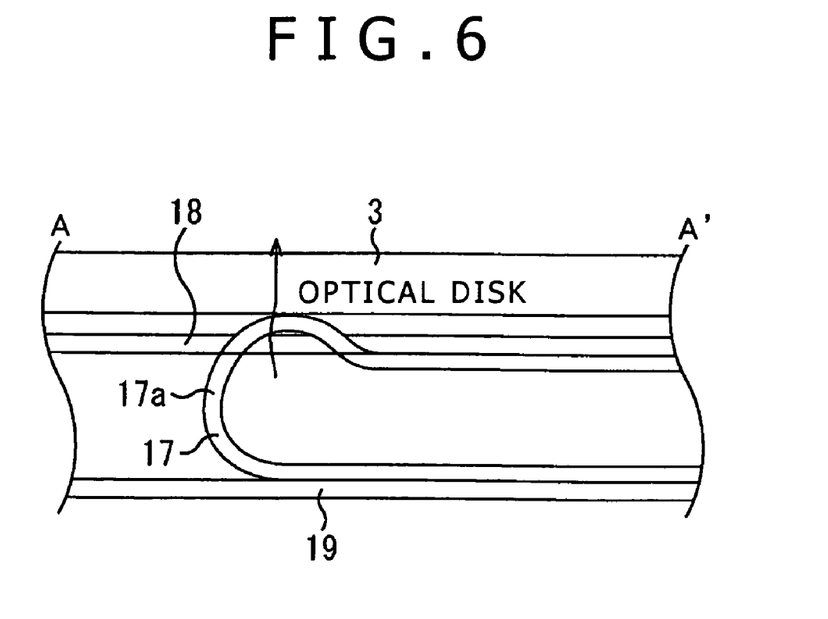
FIG. 6 is an example of a sectional view taken along line A-A' of the conventional disk drive apparatus of FIG. 3 illustrating a state wherein part of the FPC is not covered with the top cover.

FIGS. 5 and 6 show sectional views of the conventional disk drive apparatus 2 on which an optical disk 3 is mounted, taken along line A-A' of FIG. 3.

In particular, FIG. 5 shows a sectional view of the conventional disk drive apparatus 2 which incorporates an FPC 17 of a comparatively small width which is covered entirely with the top cover 18 (not shown in the drawings including FIG. 3), that is, an FPC 17 which does not protrude in the widthwise direction from the top cover 18.

Since the FPC 17 is covered entirely with the top cover 18, that is, does not protrude in a widthwise direction as seen in FIG. 5, naturally the FPC 17 does not contact (slidably contact) with the optical disk 3.

In contrast, FIG. 6 shows a sectional view of the conventional disk drive apparatus 2 which incorporates such an FPC 17 of a comparatively great width which is not entirely covered with the top cover 18 as shown in FIG. 3, that is, an FPC 17 which partly protrudes in a widthwise direction from the top cover 18.

As seen in FIG. 6, upwardly relieving force (force indicated by an arrow mark in FIG. 6) acts upon the curved portion 17a. As a result, at least part of a portion of the FPC 17 which protrudes in a widthwise direction from the top cover 18 protrudes upwardly farther than the top cover 18 and is brought into contact (sliding contact) with the lower face of the optical disk 3. In other words, the problem described above occurs.

Figure 7:
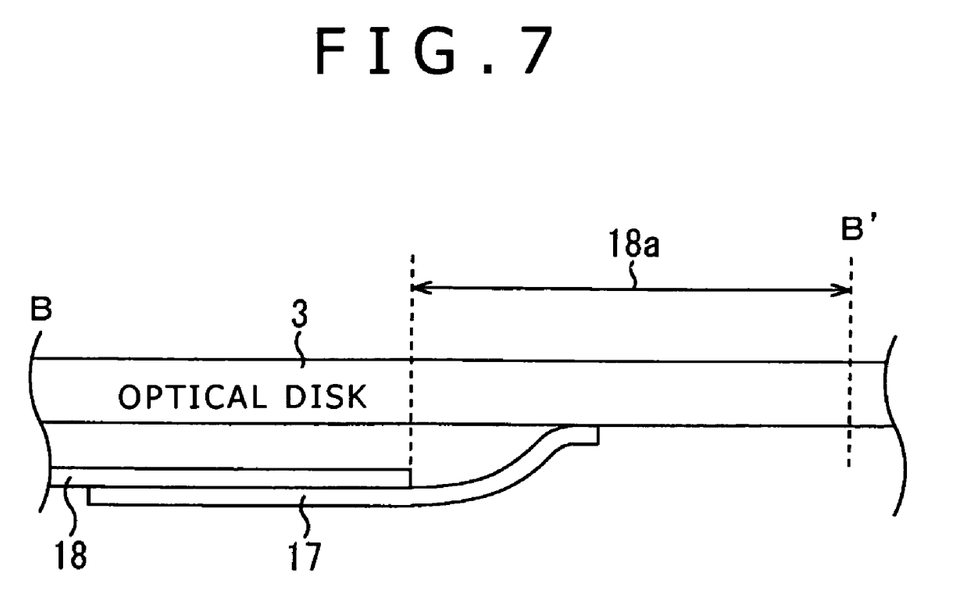
FIG. 7 is an example of a sectional view taken along line B-B' of the conventional disk drive apparatus of FIG. 3 illustrating a state wherein part of the FPC is not covered with the top cover.

FIG. 7 shows a sectional view of the conventional disk drive apparatus 2, on which the FPC 17 (FPC 17 of a comparatively great width) same as that of FIG. 6 is incorporated, taken along line B-B' of FIG. 3.

Also from FIG. 7, it can be seen that at least part of a portion of the FPC 17 which protrudes in a widthwise direction from the top cover 18 protrudes upwardly farther than the top cover 18 until it is brought into contact (sliding contact) with the lower face of the optical disk 3. In other words, it can be seen also from FIG. 7 that the problem described above occurs.

It is to be noted that also it is a possible idea, for example, to raise the rigidity of the FPC 17, more particularly to increase, for example, the thickness of the FPC 17 in order to solve such a problem as described above. This is because a portion of the FPC 17 which is covered with the top cover 18 can hold the force of the curved portion 17a tending to relieve upwardly and, as a result, the upwardly protruding amount of the portion of the FPC 17 which protrudes in a widthwise direction from the top cover 18 can be reduced.

However, the idea just described gives rise to a new problem that the rigidity of the entire FPC 17 increases and the load to the curved portion 17a increases and, as a result, the torque of a motor not shown for driving the optical pickup 16 to perform a feeding movement, that is, the torque of a motor for driving the optical pickup 16 to an inner or outer circumference (in a radial direction) of the optical disk 3, increases.

The present invention has been made in view of such a situation as described above and makes it possible to prevent contact between an FPC (flexible Printed Circuit board) and an optical disk.

Means for Solving the Problem

A first disk drive apparatus of the present invention includes an optical pickup for moving in radial directions of an optical disk to perform reading and writing of a signal from and on the optical disk, a flexible printed circuit board connected at one end portion thereof to the optical pickup and disposed in such a manner as to be extended in one of the radial directions, curved and turned back intermediately and then extended in the other one of the radial directions, a cover provided between the flexible printed circuit board and the optical disk for covering part of the flexible printed circuit board, and a guide part attached to one of faces of the cover which is opposed to the flexible printed circuit board for guiding the posture of the flexible printed circuit board such that a portion of the flexible printed circuit board which is not covered with the cover and the optical disk are spaced away from each other.

In particular, by the guide part attached to one of the faces of the cover provided between the flexible printed circuit board and the optical disk for covering part of the flexible printed circuit board which is opposed to the flexible printed circuit board, the posture of the flexible printed circuit board is guided such that the portion of the flexible printed circuit board which is not covered with the cover and the optical disk are spaced away from each other.

A second disk drive apparatus of the present invention includes an optical pickup for moving in radial directions of an optical disk to perform reading and writing of a signal from and on the optical disk, a flexible printed circuit board connected at one end portion thereof to the optical pickup and disposed in such a manner as to be extended in one of the radial directions, curved and turned back intermediately and then extended in the other one of the radial directions, and a cover provided between the flexible printed circuit board and the optical disk for covering part of the flexible printed circuit board, the cover having a shape for guiding the posture of the flexible printed circuit board such that a portion of the flexible printed circuit board which is not covered with the cover and the optical disk are spaced away from each other.

In particular, by the shape which the cover provided between the flexible printed circuit board and the optical disk for covering part of the flexible printed circuit board has, the posture of the flexible printed circuit board is guided such that the portion of the flexible printed circuit board which is not covered with the cover and the optical disk are spaced away from each other.

A first base unit of the present invention includes an optical pickup for moving in radial directions of an optical disk to perform reading and writing of a signal from and on the optical disk, a flexible printed circuit board connected at one end portion thereof to the optical pickup and disposed in such a manner as to be extended in one of the radial directions, curved and turned back intermediately and then extended in the other one of the radial directions, a cover provided between the flexible printed circuit board and the optical disk for covering part of the flexible printed circuit board, and a guide part attached to one of faces of the cover which is opposed to the flexible printed circuit board for guiding the posture of the flexible printed circuit board such that a portion of the flexible printed circuit board which is not covered with the cover and the optical disk are spaced away from each other.

In particular, by the guide part attached to that one of the faces of the cover provided between the flexible printed circuit board and the optical disk for covering part of the flexible printed circuit board which is opposed to the flexible printed circuit board, the posture of the flexible printed circuit board is guided such that the portion of the flexible printed circuit board which is not covered with the cover and the optical disk are spaced away from each other.

A second base unit of the present invention includes an optical pickup for moving in radial directions of an optical disk to perform reading and writing of a signal from and on the optical disk, a flexible printed circuit board connected at one end portion thereof to the optical pickup and disposed in such a manner as to be extended in one of the radial directions, curved and turned back intermediately and then extended in the other one of the radial directions, and a cover provided between the flexible printed circuit board and the optical disk for covering part of the flexible printed circuit board, the cover having a shape for guiding the posture of the flexible printed circuit board such that a portion of the flexible printed circuit board which is not covered with the cover and the optical disk are spaced away from each other.

In particular, by the shape which the cover provided between the flexible printed circuit board and the optical disk for covering part of the flexible printed circuit board has, the posture of the flexible printed circuit board is guided such that the portion of the flexible printed circuit board which is not covered with the cover and the optical disk are spaced away from each other.

Effects of the Invention

As described above, according to the present invention, a disk drive apparatus or a base unit on which an FPC (Flexible Printed Circuit board) of a comparatively great width is mounted can be provided. Particularly, even where part of the FPC protrudes in a widthwise direction from the top cover, contact between the protruding portion of the FPC and the optical disk can be prevented.

DESCRIPTION OF REFERENCE SYMBOLS 3 optical disk, 101 disk drive apparatus, 114 optical pickup, 116 FPC (flexible printed circuit board), 117 top cover, 117a opening, 117b guide shape, 118 guide part, 119 bottom cover

BEST MODE FOR CARRYING OUT THE INVENTION

In the following, an embodiment of the present invention is described with reference to the drawings.

Figure 8:
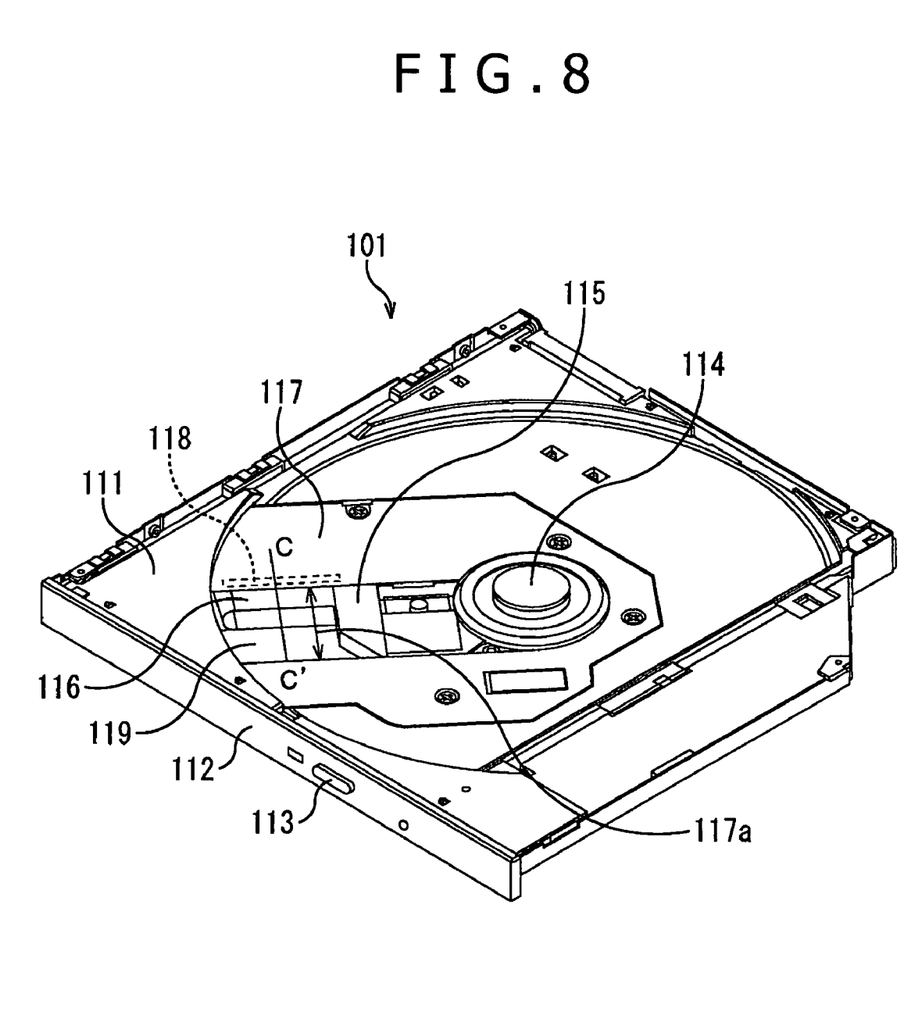
FIG. 8 is a view showing an example of a configuration of an appearance of a disk drive apparatus to which the present invention is applied with a housing removed.

FIG. 8 shows a perspective view of an embodiment of a disk drive apparatus to which the present invention is applied and which is removed from a housing, in other words, a disk drive apparatus which includes a base unit to which the present invention is applied.

Similarly to the conventional disk drive apparatus 2 described hereinabove with reference to FIG. 1, the disk drive apparatus 101 is incorporated, for example, in the apparatus body 1a of the notebook type personal computer 1 of FIG. 1 and can record an information signal supplied thereto from the apparatus body 1a on an optical disk or read out (reproduce) an information signal recorded on the optical disk and supply the information signal to the apparatus body 1a.

It is to be noted that, for simplified description, it is assumed in the following description that, for example, the optical disk 3 described hereinabove with reference to FIG. 3 is loaded into the disk drive apparatus 101.

The disk drive apparatus 101 has a very thin structure such that the entire apparatus has a thickness reduced to approximately 9.5 mm which is a thickness similar to that of a hard disk drive (HDD) unit.

Though not shown, the disk drive apparatus 101 actually includes a housing similar to the housing 11 of the conventional disk drive apparatus 2 of FIG. 2. Further, the disk drive apparatus 101 includes a portion shown in FIG. 8 which is accommodated in the housing, that is, a portion formed from a disk tray 111, a disk drive unit attached to the disk tray 111, and so forth. The disk drive unit includes a turntable 114, an optical pickup 115, an FPC 116 and so forth similarly to the disk drive unit of the conventional disk drive apparatus 2 of FIG. 2.

It is to be noted that a unit formed by adding at least a top cover 117 hereinafter described to the disk drive unit is hereinafter referred to as base unit.

The disk drive apparatus 101 further includes a front panel 112 in the form of a substantially rectangular flat plate attached to the front face (left side face in FIG. 8) of the disk tray 111 for opening and closing a tray gateway of the housing not shown, similarly to the conventional disk drive apparatus 2. An eject button 113 for being depressed in order to eject the disk tray 111 from the housing is provided on the front face of the front panel 112.

It is to be noted that, since detailed description of the housing and detailed description of accommodation or taking out of the disk tray 111 into or from the housing do not have a direct relation to the present invention and besides are of contents which can be recognized readily by those skilled in the art, they are omitted in the present specification.

Incidentally, the turntable 114 drives the optical disk 3 placed thereon to rotate under the control of a driving mechanism not shown.

The optical pickup 115 performs feeding movement under the control of a feeding mechanism not shown and performs writing or reading out operation of a signal on or from the optical disk 3 in accordance with various instructions supplied thereto from the FPC 116.

Various signal lines for transmitting various signals to be transferred between the optical pickup 115 and the personal computer 1 and so forth, for example, an instruction signal for performing writing or reading out operation of a signal on or from the optical disk 3 described hereinabove and a signal of an object of writing or reading out, are laid on the FPC 116.

To this end, the FPC 116 is connected at one end portion thereof to the optical pickup 115 and at the other end portion thereof to a connector not shown disposed below the optical pickup 115 and below and in the proximity of the turntable 114. In particular, the FPC 116 is disposed such that it is connected at the one end portion thereof to the optical pickup 115, extended in one of the opposite feeding directions (substantially leftwardly in FIG. 8) of the optical pickup 115, curved and turned back intermediately and then extended in the other one of the feeding directions (substantially rightwardly in FIG. 8). Accordingly, also the FPC 116 has a curved portion similar to the curved portion 17a of the conventional FPC 17 described hereinabove with reference to FIG. 6 and is drawn between the optical pickup 115 and the connector. In particular, also the position of the curved portion of the FPC 17 (position in the feeding direction) moves in response to the feeding movement of the optical pickup 115.

In this manner, the elements from the disk tray 111 to the FPC 116 have basically similar functions and configurations to those of the elements from the disk tray 12 to the FPC 17, respectively. In other words, the elements from the disk tray 111 to the FPC 116 can be applied as they are to the elements from the disk tray 12 to the FPC 17 of the conventional apparatus, respectively.

Accordingly, since it is considered that further details of the functions and configurations of the elements from the disk tray 111 to the FPC 116 do not have a direct relation to the present invention and besides are of contents which can be recognized readily by those skilled in the art, they are omitted herein.

Also the driving mechanism for the turntable 114, the feeding mechanism (mechanism for performing a feeding movement) of the optical pickup 115 and other various driving mechanisms of the disk drive apparatus 101, all not shown, do not have a direct relation to the present invention. Therefore, detailed description of them is omitted herein.

Incidentally, also in the disk drive apparatus 101 (base unit) of the present embodiment, the top cover 117 is provided between the disk tray 111 and the FPC 116, and a bottom cover 119 is provided below the FPC 116.

Also the top cover 117 has such an opening 117a opened by a predetermined distance in the widthwise direction as shown in FIG. 8 so that light between the optical pickup 115 and the optical disk 3 may not be interrupted.

To this end, where, for example, an FPC 116 of a comparatively great width is incorporated as seen in FIG. 8, at least part of the FPC 116 sometimes protrudes in a widthwise direction from the top cover 117. In such an instance, if no countermeasure is taken, then at least part of the portion (portion shown in FIG. 8) of the FPC 116 which projects in a widthwise direction from the top cover 117 protrudes also upwardly farther than the top cover 117 and contacts (slidably contacts) with the lower face of the optical disk 3. In other words, the problem of the conventional apparatus described hereinabove occurs.

Therefore, in order to prevent occurrence of the problem of the conventional apparatus, that is, in order to solve the subject of the conventional apparatus, in the disk drive apparatus 101 of the present embodiment (base unit of the present embodiment), a part 118 for preventing upward protrusion of the FPC 116 is located, as shown in FIG. 8, at a portion of the lower face of the top cover 117 which corresponds to a framework of a dotted line in FIG. 8.

The part 118 which is one of characteristics of the present invention is described in more detail with reference to FIG. 9. In particular, FIG. 9 is a view for facilitating understandings of a function of the part 118 and shows a sectional view taken along line C-C' of FIG. 8 of the disk drive apparatus 101 (base unit) of the present embodiment on which the optical disk 3 is mounted.

Figure 9:
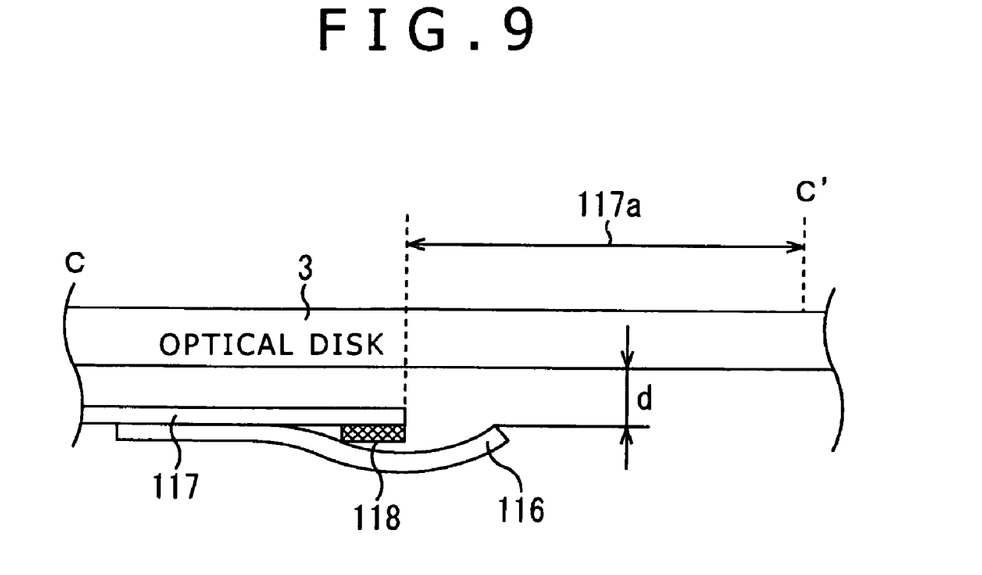
FIG. 9 is an example of a sectional view taken along line C-C' of the disk drive apparatus of FIG. 8 to which the present invention is applied and is a view illustrating a guide part of FIG. 8.

As shown in FIG. 9, the part 118 is mounted so as to guide the posture of the FPC 116 along the lower face (face opposing to the FPC 116) of the top cover 117. Therefore, the part 118 is hereinafter referred to as guide part 118.

In particular, the guide part 118 is attached to the rear face of the top cover 117 such that a gap d is formed between the portion of the FPC 116, which protrudes in a widthwise direction (C-C' direction in FIG. 9) from the top cover 117, and the optical disk 3.

In other words, the form of the guide part 118 is not limited particularly and may be any of various forms only if the guide part 118 has a function of guiding the posture of the FPC 116, that is, a function of forming the gap d between the portion of the FPC 116, which protrudes in a widthwise direction (C-C' direction in FIG. 9) from the top cover 117, and the optical disk 3.

It is to be noted that the guide part 118 need not have a function of making the gap d always have a fixed distance. In other words, the distance of the gap d may be varied in response to movement of the curved portion of the FPC 116 which follows up the feeding movement of the optical pickup 115, and the guide part 118 is sufficient only if it has a function of making the minimum distance which may be taken by the gap d greater than at least 0 mm.

More particularly, for example, the guide part 118 may be formed from a sliding tape or the like.

Figure 10:
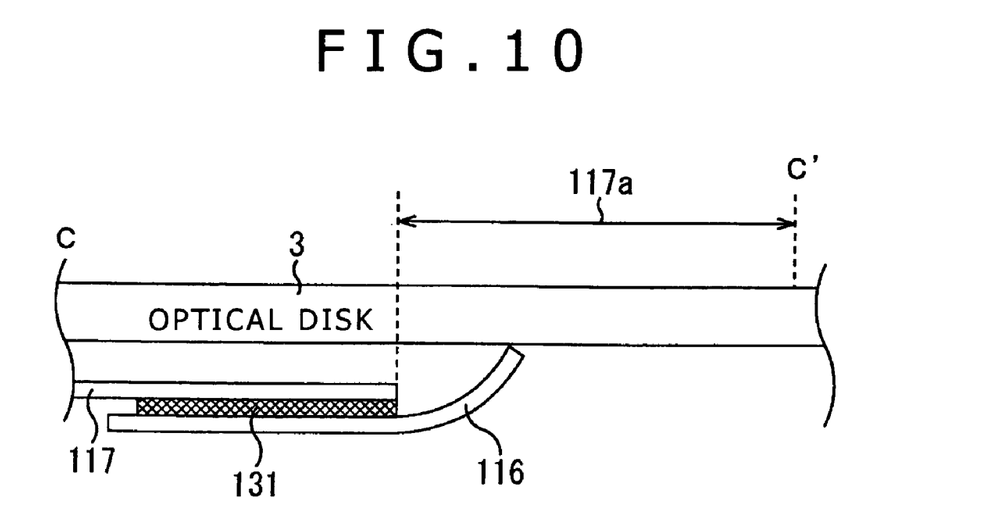
FIG. 10 is an example of a sectional view taken along line C-C' of the disk drive apparatus of FIG. 8 where a conventional sliding tape which is not appropriate as a guide part of FIGS. 8 and 9 is attached to a top cover.

However, even if such a conventional sliding tape 131, for example, as shown in FIG. 10 is used as it is, the sliding tape 131 cannot be considered as the guide part 118.

This is because the sliding tape 131 does not have the function of guiding the posture of the FPC 116, that is, the function of forming the gap d between the portion of the FPC 116 which protrudes in a widthwise direction (C-C' direction of FIG. 9) from the top cover 117 and the optical disk 3.

In particular, the sliding tape 131 is conventionally used in order to lower the resistance value when the top cover 117 and the FPC 116 contact with each other. To this end, the width (length in the direction indicated by line C-C' in FIG. 10) of the sliding tape 131 is made substantially equal to the length of the portion of the FPC 116 which protrudes in a widthwise direction (C-C' direction in FIG. 10) from the top cover 117, that is, to the length of the portion of the FPC 116 which contacts with the top cover 117. Accordingly, even if the sliding tape 131 having such a width as described above is adhered (attached) as it is to the lower face of the top cover 117 as seen in FIG. 10, a sufficient gap (such a gap d as seen in FIG. 9) is not formed between the portion of the FPC 116 which protrudes in a widthwise direction (C-C' direction in FIG. 10) from the top cover 117 and the optical disk 3.

An example of a configuration of the disk drive apparatus 101 (base unit) to which the present invention is described above with reference to FIGS. 8 to 10.

The disk drive apparatus 101 (base unit) having such a configuration as described above performs recording or reproduction (reading out) of an information signal on or from the optical disk 3 in response to a recording or reproduction instruction when the instruction is sent from the personal computer 1 of FIG. 1 in a state wherein the disk tray 111 having the optical disk 3 mounted thereon is accommodated in the housing not shown. More particularly, in the example of FIG. 8, the turntable 114 drives the optical disk 3 to rotate (under the control of the driving mechanism not shown) and the optical pickup 115 performs writing or reading out operation of a signal on or from the optical disk 3 while it moves in a radial direction of the optical disk 3 (under the control of the feeding mechanism not shown).

At this time, the posture of the FPC 116 is guided by the guide part 118 attached to the lower face of the top cover 117 as seen in FIG. 9, and the FPC 116 is disposed in a spaced relationship from the lower face of the optical disk 3 (the gap d is formed). Accordingly, such a problem that the portion of the FPC 116 which protrudes in a widthwise direction from the top cover 117 protrudes upwardly farther than the top cover 117 and slidably contacts with the optical disk 3 is eliminated. As a result, the subject of the conventional apparatus can be solved. In other words, such a problem that a signal line laid on the FPC 116 is damaged or a bad influence is had on a signal flowing along the signal line.

Figure 11:
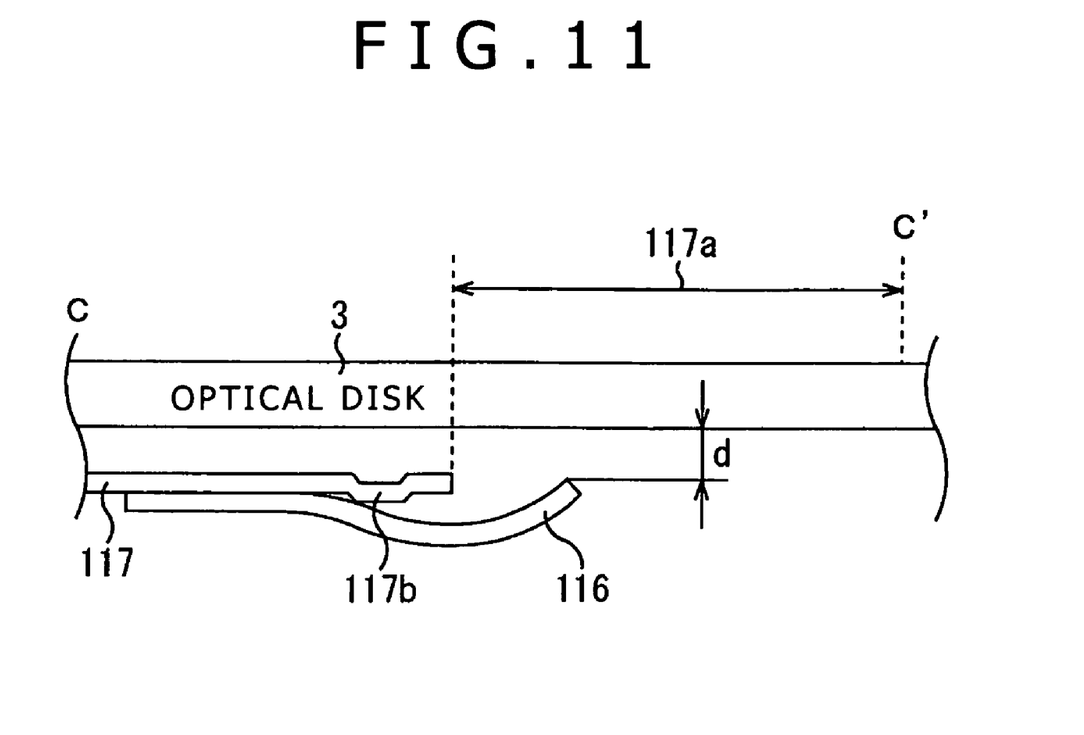
FIG. 11 is an example of a sectional view taken along line C-C' of the disk drive apparatus of FIG. 8 where, in place of the guide part of FIGS. 8 and 9, a top cover having a shape having a function similar to a function of the guide part is adopted.

Incidentally, while, in order to solve the subject of the conventional apparatus, in the example described above, the guide part 118 is attached to the top cover 117, the guide part 118 may not be attached, but alternatively the top cover 117 itself may be formed so as to have a shape 117b (which is a convex shape and hereinafter referred to as guide shape 117b for guiding the posture of the FPC 116 as shown in FIG. 11).

In other words, the function which the guide part 118 has, that is, the function of forming the gap d between the portion of the FPC 116 which protrudes in a widthwise direction (C-C' direction in FIG. 11) from the top cover 117 and the optical disk 3, need not particularly be possessed by the guide part 118 and may be assigned to an arbitrary part from among those parts which form the disk drive apparatus 101 (or the base unit of the same). As a particular example, a top cover 117 to which the function is assigned (which has a guide shape 117b having the function) is shown in FIG. 11.

It is to be noted that the present invention can be applied, in addition to the optical disk 3 described hereinabove, to an optical disk such as a magneto-optical disk and also to a disk drive apparatus which performs recording or reproduction of an information signal to any of such optical disks which are each accommodated in a disk cartridge.

Further, the present invention can be applied not only to such a disk drive apparatus 101 of the tray type wherein a disk drive unit is attached to the disk tray 111 as described hereinabove with reference to FIG. 8 but also to a disk drive apparatus (not shown) of the slot-in type wherein an optical disk is inserted and removed through a disk gateway provided on the front face of the housing.

The invention claimed is:

1. A disk drive apparatus, comprising:
an optical pickup configured to move in radial directions of an optical disk to perform reading and writing of a signal from and on the optical disk;
a flexible printed circuit board connected at one end portion thereof to said optical pickup and disposed in such a manner as to be extended in one of the radial directions, curved and turned back intermediately and then extended in the other one of the radial directions;
a cover provided between said flexible printed circuit board and the optical disk for covering part of said flexible printed circuit board, said cover comprising an opening of a predetermined size to permit the uninterrupted passage of light between said optical pickup and said optical disk; and
a guide part attached to that one of faces of said cover which is opposed to said flexible printed circuit board for guiding the posture of said flexible printed circuit board such that a portion of said flexible printed circuit board which is not covered with said cover and the optical disk are spaced away from each other, said guide part being extended from said face of said cover toward said opening.

2. The disk drive apparatus of claim 1,
said cover having a shape for guiding the posture of said flexible printed circuit board such that a portion of said flexible printed circuit board which is not covered with said cover and the optical disk are spaced away from each other.

3. A base unit, comprising:
an optical pickup configured to move in radial directions of an optical disk to perform reading and writing of a signal from and on the optical disk;
a flexible printed circuit board connected at one end portion thereof to said optical pickup and disposed in such a manner as to be extended in one of the radial directions, curved and turned back intermediately and then extended in the other one of the radial directions;
a cover provided between said flexible printed circuit board and the optical disk for covering part of said flexible printed circuit board, said cover comprising an opening of a predetermined size to permit the uninterrupted passage of light between said optical pickup and said optical disk; and
a guide part attached to one of faces of said cover which is opposed to said flexible printed circuit board for guiding the posture of said flexible printed circuit board such that a portion of said flexible printed circuit board which is not covered with said cover and the optical disk are spaced away from each other, said guide part being extended from said face of said cover toward said opening.

4. The base unit of claim 3,
said cover having a shape for guiding the posture of said flexible printed circuit board such that a portion of said flexible printed circuit board which is not covered with said cover and the optical disk are spaced away from each other.

5. The disk drive apparatus of claim 1, wherein a width of said guide part is narrower than a length of a portion of said flexible printed circuit board protruding in a widthwise direction from said top cover.

6. The base unit of claim 3, wherein a width of said guide part is narrower than a length of a portion of said flexible printed circuit board protruding in a widthwise direction from said top cover.

7. The disk drive apparatus of claim 1, wherein said guide part is extended in the direction of the radius of said optical disk.

8. The base unit of claim 3, wherein said guide part is extended in the direction of the radius of said optical disk.

* * * * *